United States Patent [19]
D'Andrea et al.

[11] Patent Number: 5,682,517
[45] Date of Patent: Oct. 28, 1997

[54] METHOD OF TRANSFERRING DATA TO A MEMORY MEDIUM IN A MAILING MACHINE

[75] Inventors: Thomas A. D'Andrea, Middlebury; Kevin D. Hunter, Stratford, both of Conn.

[73] Assignee: Pitney Bowes Inc., Stamford, Conn.

[21] Appl. No.: 264,125

[22] Filed: Jun. 21, 1994

[51] Int. Cl.$^6$ .................................................. G06F 12/16
[52] U.S. Cl. ................... 395/489; 395/182.06; 395/600; 371/10.1; 364/464.02
[58] Field of Search .................................. 395/833, 840, 395/841, 842, 843, 853, 404, 428, 497.01, 497.04, 600, 182.03, 182.04, 872, 200.08, 827, 474, 489, 412, 182.01, 182.06, 182.11, 800; 364/243.2, 243.5, 246, 248, 248.1, 248.2, 249.8, 255.7, 256.4, 464.02; 371/8.1, 10.1–10.2, 11.1–11.3

[56] References Cited

U.S. PATENT DOCUMENTS

| | | | |
|---|---|---|---|
| 4,420,819 | 12/1983 | Price et al. | 395/872 |
| 4,447,887 | 5/1984 | Imazeki et al. | 395/443 |
| 4,802,117 | 1/1989 | Chrosny et al. | 395/182.03 |
| 4,845,632 | 7/1989 | Kroll et al. | 364/464.02 |
| 4,998,203 | 3/1991 | DiGiulio et al. | 364/464.02 |
| 5,023,813 | 6/1991 | Brown, III | 364/519 |
| 5,043,871 | 8/1991 | Nishigaki et al. | 364/200 |
| 5,086,502 | 2/1992 | Malcolm | 395/575 |
| 5,109,507 | 4/1992 | Check, Jr. | 395/182.04 |
| 5,195,100 | 3/1993 | Katz et al. | 371/66 |
| 5,241,672 | 8/1993 | Slomcenski et al. | 395/618 |
| 5,404,508 | 4/1995 | Konrad et al. | 395/600 |
| 5,421,003 | 5/1995 | Escola et al. | 395/575 |
| 5,438,559 | 8/1995 | Best et al. | 369/54 |
| 5,442,493 | 8/1995 | Shih et al. | 360/48 |
| 5,469,453 | 11/1995 | Glider et al. | 371/68.1 |
| 5,475,697 | 12/1995 | Katz et al. | 395/486 |
| 5,513,112 | 4/1996 | Herring et al. | 364/464.02 |

OTHER PUBLICATIONS

Microprocessor and Microsystems, vol. 9, No. 4, May 1985, London GB pages 179–183.

*Primary Examiner*—Alpesh M. Shah
*Attorney, Agent, or Firm*—Steven J. Shapiro; Melvin J. Scolnick

[57] ABSTRACT

A method of transferring update data from a microcomputer to a memory device having a transportable non-volatile memory median requiring that the transportable non-volatile memory median is divided into a plurality of sectors. Update data is to be written to data sectors of the transportable non-volatile memory median in accordance with a sector map. One of the sectors to be updated is the directory sector and another one of the sectors to be updated is the file access table sector. The microcomputer is programmed to reserve a specified number of sectors as a recovery area wherein some of the sectors of the recovery area are reserved for the sector map and other sectors of the recovery area are reserved for storage of the update data. The microcomputer identifies if a sector map resides in the recovery area. If no sector map resides in the sector map area of the recovery area, the microcomputer proceeds to identify which of the sectors are to be updated and generating a sector map accordingly. If a sector map resides in the recovery area, the microcomputer first writes data from the recovery area to the sectors according to the sector map and then proceeds to identify which of the sectors are to be updated and generating a sector map of the sectors to be updated. The microcomputer then writes the sector map and the update data to the recovery area before writing the update data to the sectors in accordance with the sector map. Once the respective sectors are updated the sector map is erased.

1 Claim, 5 Drawing Sheets

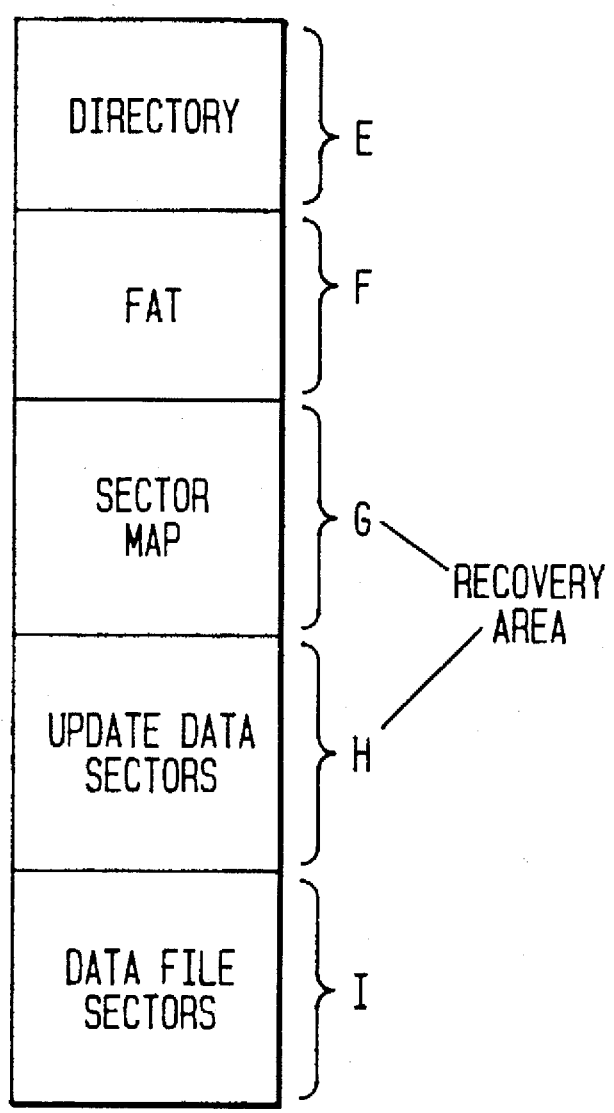

METHOD OF TRANSFERRING DATA TO A MEMORY MEDIUM IN A MAILING MACHINE

BACKGROUND OF THE INVENTION

The present invention relates to a method of transferring data to a transportable non-volatile memory medium and, more particularly, to a method maintaining prior data integrity during data transfer.

It is known to provide microcomputer and other computing systems with transportable, non-volatile, memory storage devices, such as, floppy disk systems. Conventionally, data, which is generated by an application program, is stored in random access memory (RAM) of the microcomputer. Pursuant to operator request or other triggering event, the data in RAM is conventionally transferred to a non-volatile memory medium which may be removable, such as, a magnetic floppy disk storage system. It is known that, if the data transfer process is interrupted prior to completion of the transfer process, the data file directory on the floppy disk may be compromised and the data files may be corrupted. Special recovery procedures must then be employed to recover the data from the floppy disk and the corrupted data corrected.

SUMMARY OF THE INVENTION

It is an objective of the present invention to present a method and process of writing data to a non-volatile memory which may be a removable memory medium from a volatile memory wherein the write process is reconstructable, if the process is unexpectedly interrupted.

It is a further objective of the present invention to present a method and process of writing data to a multiple sector removable non-volatile memory wherein the write process is reconstructable if the process is unexpectedly interrupted and the reconstruction process maintains critical data integrity.

It is still a further objective of the present invention to present a method and process of reconstructing data wherein data reconstruction may be carried out on any suitably programmed microcomputer system.

A microcomputer system particularly suited for a mail processing system includes a random access memory (RAM) and a disk storage device. In the preferred embodiment, the disk storage device provides for the microcomputer to record critical accounting information from its RAM onto a removable recording medium, for example, a magnetic floppy or optical disk. The microcomputer operates under the influence of a disk operating system which requires the recording medium to be formatted such that a plurality of sectors are provided; directory sector, file access table (FAT) sector, a multi-sector file recovery area, and the remaining sectors are data sectors.

The microprocessor is programmed upon system start-up or reset, to clear a designated RAM-based control area. Upon placement of a floppy disk within the disk storage device, e.g., conventional magnetic disk drive, the microprocessor is programmed to register the disk drive as enabled and check the designated file recovery sector of the disk drive. If the file recovery sector of the floppy disk are determined by the microprocessor programming to have a resident sector map and, necessarily, accompanying data in the file recovery sector, then the data in the file recovery sector is transferred to the appropriate data file sectors and the directory and FAT are updated. The file recovery sector of the floppy disk is then cleared and new data may be accepted. If the file recovery sectors of the floppy disk are clear upon system start-up, then the microcomputer is programmed to interpret that file recovery area status as the last file transfer was completed. If the file recovery sectors are determined to have incomplete data, i.e., an incomplete sector map, the microprocessor is programmed to interpret the last data transfer as aborted and that data transfer may be re-initiated.

In order to perform a write to the floppy disk, the microcomputer is programmed to identify the sectors on the disk to be updated and the new data for each sector. The new data for each sector is written to the recovery sector of the disk. The recovery sector map is then written to the specified sector of the recovery area. The data is then written to the determined sector of the floppy disk and the recovery map on the floppy disk is then erased.

It should be appreciated that if the data write process is interrupted prior to the completed step of writing the sector map into the recovery area, the previously written data is intact. The recovery process is initiated by any suitably programmed microcomputer by a read of the recovery map. If the recovery map sector is incomplete, the suitably programmed microcomputer is programmed to interpret that the last data transfer attempt was interrupted prior to completion. If the recovery map is complete, the suitably programmed microcomputer is programmed to copy data from the recovery area to its mapped destination and erase the recovery map.

BRIEF DESCRIPTION OF THE DRAWINGS

FIG. 2 is a diagram of the memory sector for the floppy disk memory unit in accordance with the present invention.

DETAILED DESCRIPTION OF THE PREFERRED EMBODIMENT

Figure 1:
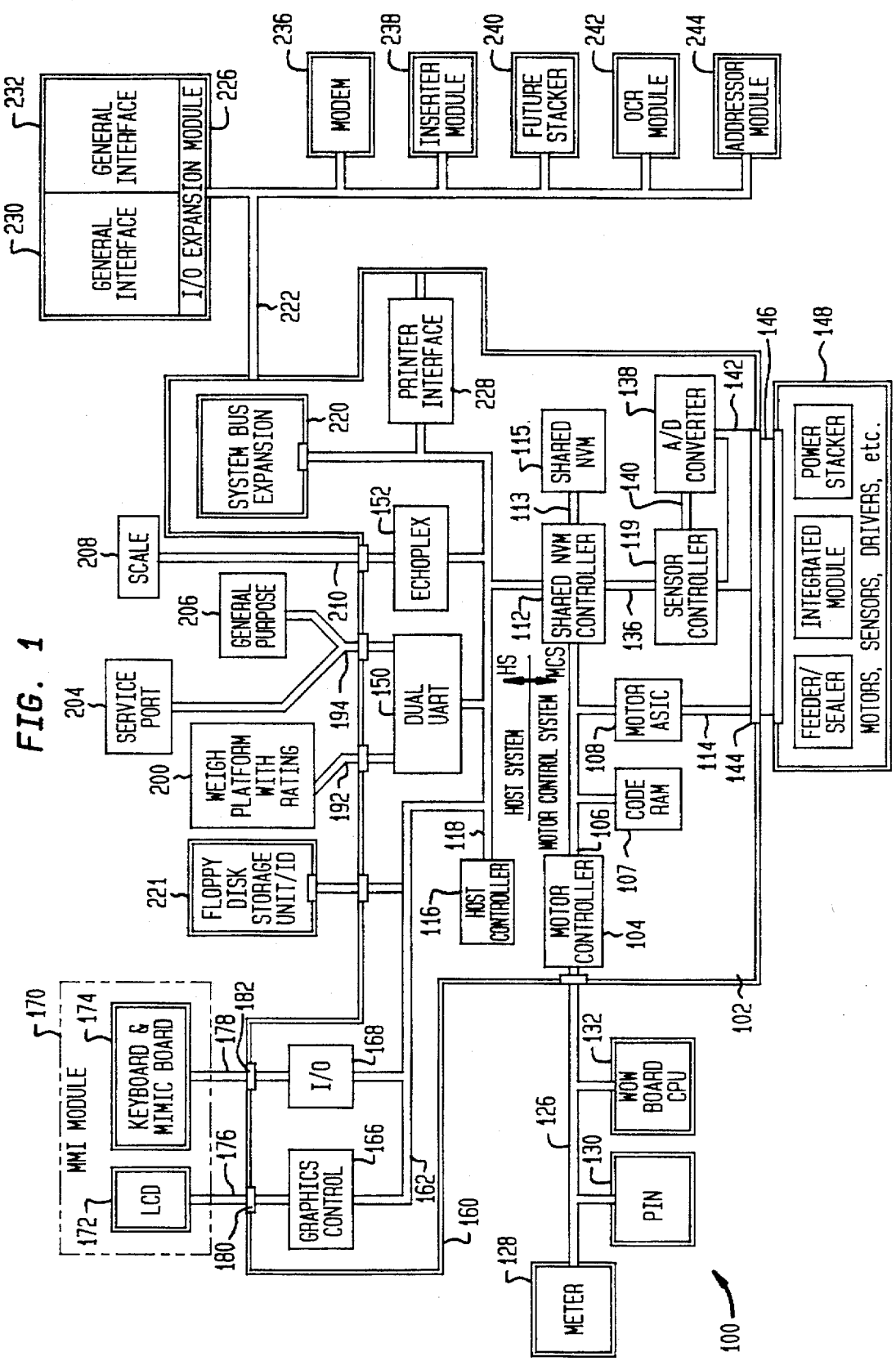
FIG. 1 is a schematic of the microcomputer control system having a non-volatile disk storage interface, the microcomputer control system being programmed to effect data transfer to a suitable non-volatile disk in accordance with the present invention.
Figure 3A:
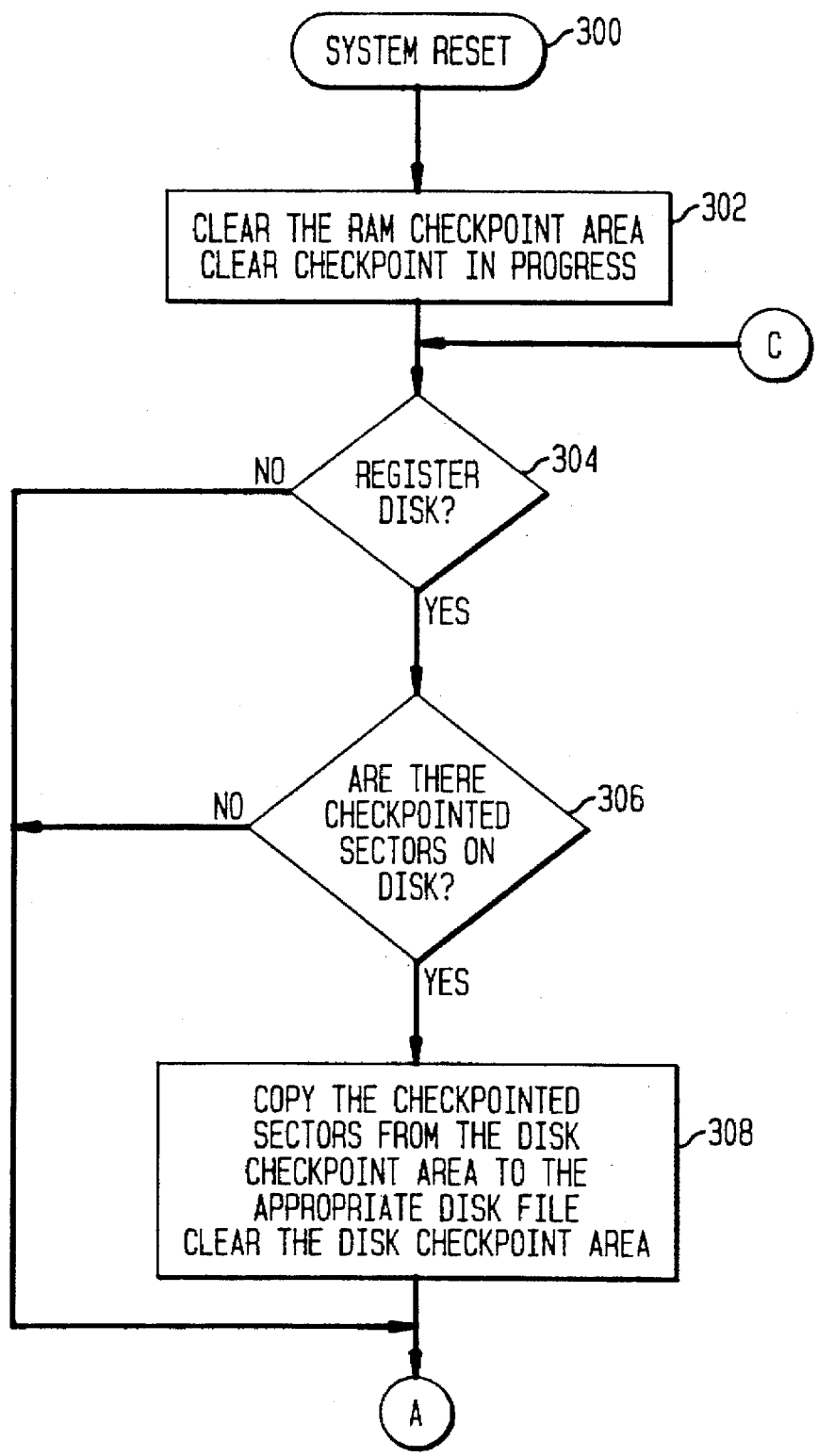
FIGS. 3A, 3B and 3C are a flow chart of the method step for data transfer in accordance with the present invention.
Figure 3B:
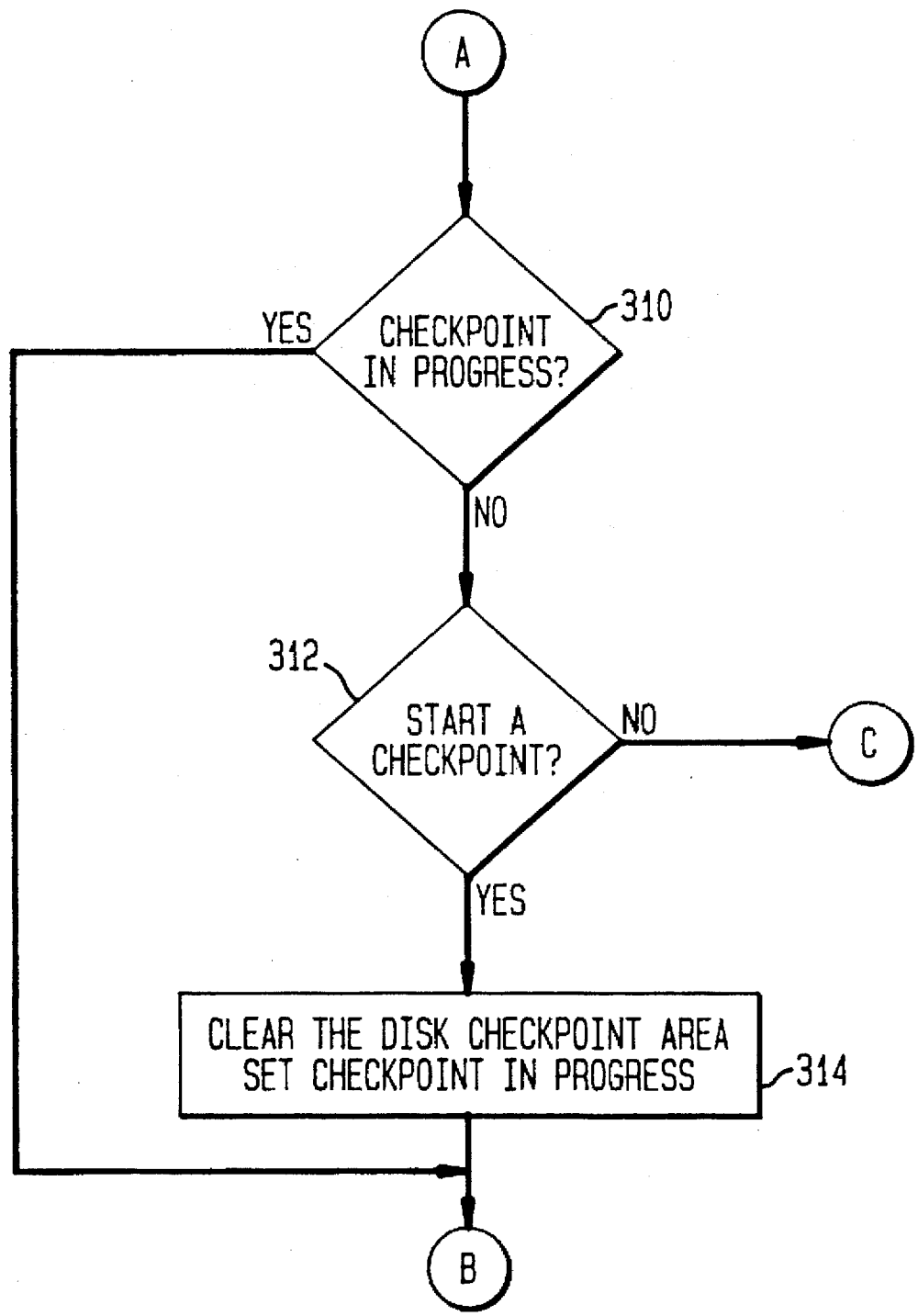
Figure 3C:
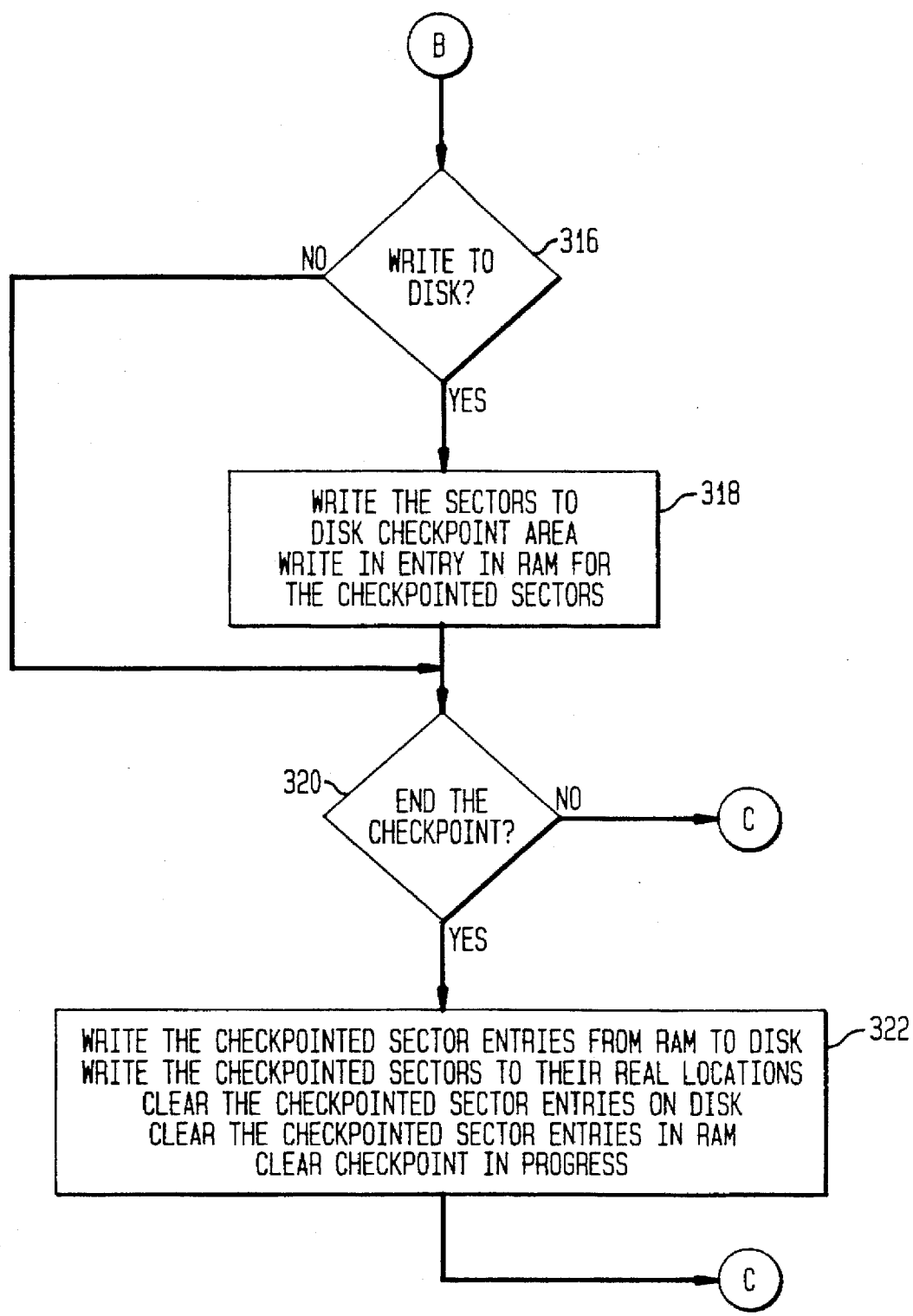

Referring more particularly to FIG. 1, a suitable microcomputer system, generally indicated as 100, is comprised of a core board 102 having located thereon a microprocessor based motor controller 104 in bus 106 communication with a code read only memory (ROM) 107, a motor application specific integrated circuit (ASIC) 108 and a shared non-volatile memory (NVM) controller 112. A microprocessor based host controller 116 is also in bus 118 communication with the shared NVM controller 112. The motor controller 104 is in bus 126 communication with a meter board 128, a parcel identification board (PIN) 130 and scale board 132, also referred to as Weight On The Way (WOW) board 132. Also in communication with the host controller bus 118, and thereby the host controller 116, are DUAL UART input-output (I/O) module 150, a Echoplex communication I/O module 152, a graphic controller 166 and keyboard I/O 168. The NVM controller 112 is in bus 113 communication with a shared non-volatile memory NVM 115.

A microprocessor based sensor controller 119 is in bus 136 communication with the NVM controller 112. An analog-to-digital (A/D) converter 138 is in bus 140 communication with the sensor controller 119. A sensor bus 142 communicates the sensor controller 119 and A/D converter 138 to the harness coupler 144. A flex harness 146 is attached to the harness coupler 144 at one end and to the respective drive motors and sensors (not shown) of the postage meter mailing machine. A more detailed description of a particularly suitable postage meter mailing machine is described in U.S. Pat. No. 4,935,078 entitled HIGH THROUGHPUT MAILING MACHINE TIMING, herein incorporated by reference.

A graphics controller 166 and a combination keyboard and MIMIC I/O port 168 are in communication with the bus 118. A man machine interface module 170 including a liquid crystal display (LCD) board 172 and a keyboard and MIMIC board 174 which are in respective bus 176 and 178 communication with the graphics controller 166 and I/O board 168 through respective couplers 180 and 182. For completeness of the preferred embodiment, the dual communication module 150 permits bus 192 and 194 coupling thereto of a weighing platform with integrated rating 200, a service communication port 204 or such other general purpose device 206. In like manner, an echoplexed scale 208 may be coupled to the echoplex I/O module 152 by bus 210. A printer interface module 228 also communicates with the bus 118.

A system bus controller 220 is in bus communication with the host controller bus 118 through the bus 118. Also a floppy disk I/O module 221 is in communication with the host controller bus 118. The system bus 222 provides communication of the system bus controller 220 with a I/O expansion module 226 from which may be coupled to a general purpose interface 230 and a custom parallel interface 232 in a conventional manner. Other optional devices, such as, a modem 236, an inserter module 238, an OCR module 242, an addresser module 244 and an additional stacker module 240 may be carried by bus 224 for communication in any suitable conventional manner Referring to FIGS. 2, 3A, 3B and 3C, the host controller 116 is programmed such that when the system 100 is reset at logic block 300, the host controller 116 is programmed to clear a checksum area in RAM and clear a flag which indicates that no checkpoint is in process at logic block 302. The term "checkpoint" is used to describe the hereafter process of transferring data. A check is then performed at decision block 304 to see if a disk drive enabled has been registered with the host controller 116. If a disk has been registered, a check is then performed to see if the recovery area checkpoint sectors of the disk are occupied at logic block 306. If the checkpoint sectors are occupied, a copy is made of the checkpoint sectors from the disk to the checkpoint area of the appropriate disk files and clears the disk checkpoint area at logic block 308. The routine then proceeds to decision block 310.

Referring back to logic block 304, if a disk is not registered or there are checkpoint sectors on the disk that have no resident information from logic block 306, then the routine proceeds directly to decision block 310.

At logic block 310, the routine checks to see if a checkpoint operation is in process. If a checkpoint operation is not in process, then the routine proceeds to see if there is any information in the system RAM which requires a checkpoint operation. If there is no necessity for a checkpoint operation, the routine proceeds to logic block 314. If the microprocessor host controller 116 wishes to start a checkpointing routine, then the routine proceeds to logic block 314 to clear the checkpoint area and set the checkpoint flag to show that a checkpoint is in process. The routine then proceeds to logic block 316. Referring back to logic block 310, if a checkpointing process is in process, then the routine proceeds directly to decision block 316.

At decision block 316, a check is performed to see if the host controller 116 has initiated a write to disk. If the write has been initiated, then the information is written to the sectors of the checkpoint area on the disk and a write RAM for the checkpoint sectors at logic block 318, i.e., prepare a sector map. If at logic block 316 a write has not been commenced or finished, then the routine proceeds directly to decision block 320 to see if the host controller wishes to end the checkpoint routine. If the host controller does not, then the routine proceeds back to decision block 304 to see if a disk has been registered. If the host controller does wish to end the checkpointing routine at logic block 320, then the routine proceeds to logic block 322 to write the checkpoint sectors map from the RAM to the disk, write the checkpoint sectors to their real locations on the disk, clear the checkpoint sector map on the disk, clear the checkpoint sector map in the RAM, and clear the checkpointing in process flag. At this point, the routine returns to decision block 304.

The following has been a detailed description of the preferred embodiment and should not be determined as limiting the invention. The scope of the invention is defined by the appended claims.

What is claimed is:

1. In a mailing system having a microcomputer and a memory device having a transportable, non-volatile memory medium, said medium being divided into a plurality of sectors, a method of transferring update data from said microcomputer to said memory device wherein update data is to be written to third ones of said sectors in accordance with a sector map and one of said sectors is a directory sector and another one of said sectors is a file access table sector, comprising programming said microcomputer to perform the steps of:

a) reserving a first plurality of said sectors as a recovery area wherein a first one of said sectors of said recovery area is reserved for said sector map and second ones of said sectors of said recovery area are reserved for storage of said update data;

b) identifying if said sector map resides in said recovery area, if no sector map resides, proceed to step c, if said sector map resides in said recovery area, writing said update data from said recovery area to said sectors according to said sector map, then proceed to step c;

c) identifying which of said sectors are to be updated and generating a sector map of said sectors to be updated;

d) writing next update data to said recovery area;

e) writing said sector map of said sectors to be updated to said recovery area;

f) writing said next update data from said recovery area to said sectors to be updated in accordance with said sector map of said sectors to be updated;

g) updating said file access table sector of said transportable, non-volatile memory medium;

h) updating said directory of said transportable, non-volatile memory medium; and i) erasing said sector map of said sectors to be updated.

* * * * *